United States Patent [19]

Nagai

[11] Patent Number: 5,194,961
[45] Date of Patent: Mar. 16, 1993

[54] APPARATUS FOR LOCKING A REPRODUCED COLOR VIDEO SIGNAL TO A REFERENCE COLOR FRAME SIGNAL

[75] Inventor: Yasuo Nagai, Kanagawa, Japan

[73] Assignee: Sony Corporation, Tokyo, Japan

[21] Appl. No.: 795,791

[22] Filed: Nov. 21, 1991

[30] Foreign Application Priority Data

Nov. 27, 1990 [JP] Japan .................... 2-323728

[51] Int. Cl.$^5$ .............................. H04N 9/79
[52] U.S. Cl. .................... 358/310; 358/320; 358/323; 358/335; 358/338
[58] Field of Search ............ 358/310, 316, 318, 320, 358/323, 324, 335, 338, 321, 322; 360/33.1, 35.1

[56] References Cited

U.S. PATENT DOCUMENTS

| | | | |
|---|---|---|---|
| 3,878,557 | 4/1975 | Vidovic | 358/326 |
| 3,890,638 | 6/1975 | Bargen | 358/326 |
| 4,115,800 | 9/1978 | Sakamoto | 358/323 |
| 4,768,102 | 8/1988 | O'Gwynn | 358/324 |
| 4,858,027 | 8/1989 | Sashou et al. | 360/14.1 |

*Primary Examiner*—Tommy P. Chin
*Assistant Examiner*—Khoi Truong
*Attorney, Agent, or Firm*—Lewis H. Eslinger; Jay H. Maioli; Donald S. Dowden

[57] ABSTRACT

A color video signal reproducing apparatus for reproducing a color video signal and a control signal for indicating a color frame of the color video signal from a record medium includes a generator for generating a reference color frame, a generator for generating a signal having a frequency which is a multiple (integer) of the frequency of a reference frame signal, a circuit for separating a reproduced color frame and a reproduced frame signal from the control signal being reproduced, a circuit for generating a phase where intervals of the reproduced frame signal is divided, a circuit for determining a start reference signal phase by using the reproduced color frame and the divided phase, the start reference signal phase causing movement of the record medium to be started, and a controller for controlling the movement of the record medium in accordance with the start reference signal phase and a predetermined acceleration duration of the record medium.

4 Claims, 3 Drawing Sheets

Fig. 2

| | 1 COLOR FRAME | | | | | | | |
|---|---|---|---|---|---|---|---|---|
| SF1,PCF1<br>SF0,PCF0 | 0 ("L") | | | | 1 ("H") | | | |
| PF1<br>PF0 | 0 | 1 | 2 | 3 | 0 | 1 | 2 | 3 |
| | A | B | C | D | E | F | G | H |
| n | 1 | 2 | 3 | 4 | 5 | 6 | 7 | 8 |

APPARATUS FOR LOCKING A REPRODUCED COLOR VIDEO SIGNAL TO A REFERENCE COLOR FRAME SIGNAL

BACKGROUND OF THE INVENTION

1. Field of the Invention

The present invention relates to a color video signal reproducing apparatus and, in particular, relates to one for locking a color frame with a control signal (CTL signal) recorded on a tape.

2. Description of the Prior Art

In a helical type video tape recorder (hereinafter simply named a VTR), by using a tracking technique where rotating magnetic heads follow a track formed on a magnetic tape, even when a signal is reproduced in a different speed reproduction mode where the magnetic tape is traveled at a different speed from that at which it was recorded, an image with a high quality can be obtained. The capstan motor is controlled so that the tracking reproduces a CTL signal which is recorded in the longitudinal direction of the magnetic tape and the phase of the reproduced CTL signal matches a servo reference.

In a broadcasting station, the start position of a news material, a commercial message (CM) material and the like is checked previously by reproducing it in the still reproduction mode of a VTR. At a desired time, the VTR is switched to constant speed reproduction mode and then the news material, commercial material and the like is broadcast. In this case, when the signal is switched, a color frame of a reproduced color video signal of the VTR should be immediately synchronized with that of a reference color video signal of the broadcasting station so as to keep color subcarriers and sync signals continuous.

In the above mentioned method where the CTL signal is detected and then servo-locked, the magnetic tape is started up from the stop state to the normal (×1) speed traveling state. In addition, the phase of the CTL signal reproduced from the magnetic tape is matched with that of the reference color video signal. In order to perform this operation quickly, it is necessary to drive the magnetic tape with a maximum acceleration and control the system so that the phase of the CTL signal which was just reproduced matches that of the reference color video signal when the speed of the magnetic tape becomes the normal (×1) speed.

As this type of technique, when the particular speed is obtained after the traveling speed of the magnetic tape is constantly accelerated both the phases are matched in phase comparison mode. For example, a prior art system according to this type of technique is officially disclosed as Japanese Patent Laid-open No. SHO 61-290893. This prior art is such that a capstan motor, a magnetic tape, and so forth are stopped in the still reproduction mode and a color frame at this time is written to memory. Thereafter, when the still reproduction mode is switched to the constant speed reproduction mode, the capstan motor is started and rotates at a high speed and thereby the magnetic tape is rapidly moved. When a start command signal is sent, the color frame of the reference color video signal is compared with that of the reproduced color video signal which is read from the memory and at which the magnetic tape was stopped. When an ID signal of the reproduced color video signal is detected in a particular period of time equally spaced from that of the reference color video signal, it is determined that both the color frames are matched and thereby 2n frames are phase matched. On the other hand, when the ID signal of the reproduced color video signal is not detected in the above mentioned period of time, it is determined that both the color frames are not matched and thereby (2n+1) frames are phase matched. In this manner, the phase of the reference color video signal can be matched with that of the reproduced color video signal.

However, according to the above mentioned prior art, a particular number of frames should be phase matched so as to match the phase of the reference color video signal and that of the reproduced color video signal.

To solve such a problem, a technique known as the so-called stop control has been developed. In this technique, the phase of the CTL signal is read until the magnetic tape is stopped. The magnetic tape is stopped at an optimum phase (namely, so that the phase of the reproduced CTL signal is matched with that of the reference color video signal when the magnetic tape with the maximum acceleration applied is driven at the normal (×1) speed). Thereafter, the magnetic tape is started from such a phase.

With this technique, the phase matching operation is not necessary. However, the probability where the phases of the color frames are matched in the NTSC scheme is 50% because one color frame is composed of two frames; and that in the PAL scheme is 25% because one color frame is composed of four frames. When the phases of the color frames are not matched and the color frames are locked, the lock up time becomes disadvantageously long.

OBJECT AND SUMMARY OF THE INVENTION

It is, therefore, an object of the present invention to provide a color video signal reproducing apparatus where the phases of color frames can be securely matched and thereby the lock up time can be shortened.

According to an aspect of the present invention, there is provided a color video signal reproducing apparatus for reproducing a color video signal and a control signal for indicating a color frame of the color video signal from a record medium, comprising a generator for generating a reference color frame, a generator for generating a signal having a frequency which is a multiple (integer) of the frequency of a reference frame signal, a circuit for separating a reproduced color frame and a reproduced frame signal from the control signal being reproduced, a circuit for generating a phase where intervals of the reproduced frame signal is divided, a circuit for determining a start reference signal phase by using the reproduced color frame and the divided phase, the start reference signal phase causing the record medium to be started, and a controller for controlling the movement of the record medium in accordance with the start reference signal phase and a predetermined acceleration duration of the record medium. In the above mentioned construction, the reference color frame phase and the reference frame phase are formed in accordance with the reference color video signal. When a magnetic tape 2 is stopped, the reproduced color frame phase and the reproduced frame phase are formed by using the reproduced CTL signal and the FG pulse. By using the relation between a predetermined period of time and a frame phase when the magnetic tape is traveled at the normal (×1) speed after it is stopped, an optimum start point (a start reference signal phase) is determined. The magnetic tape remains stopped until the reference color frame phase and the reference frame phase obtained from the reference color video signal match the reference signal phase. When these phases match the start reference signal phase, the traveling of the magnetic tape is started.

The above and other objects, features and advantage of the present invention will become readily apparent from the following detailed description thereof which is to be read in connection with the accompanying drawings.

BRIEF DESCRIPTION OF THE DRAWINGS

FIG. 2 is a schematic diagram showing the relation between a color frame phase and a frame phase and the relation between a reference color frame phase and a reference frame phase.

DETAILED DESCRIPTION OF THE PREFERRED EMBODIMENT

Now, with reference to the accompanying drawings FIG. 1 to FIG. 3, an embodiment of the present invention will be described. In the embodiment, a color video signal in accordance with the NTSC scheme is described as an example.

Figure 1:
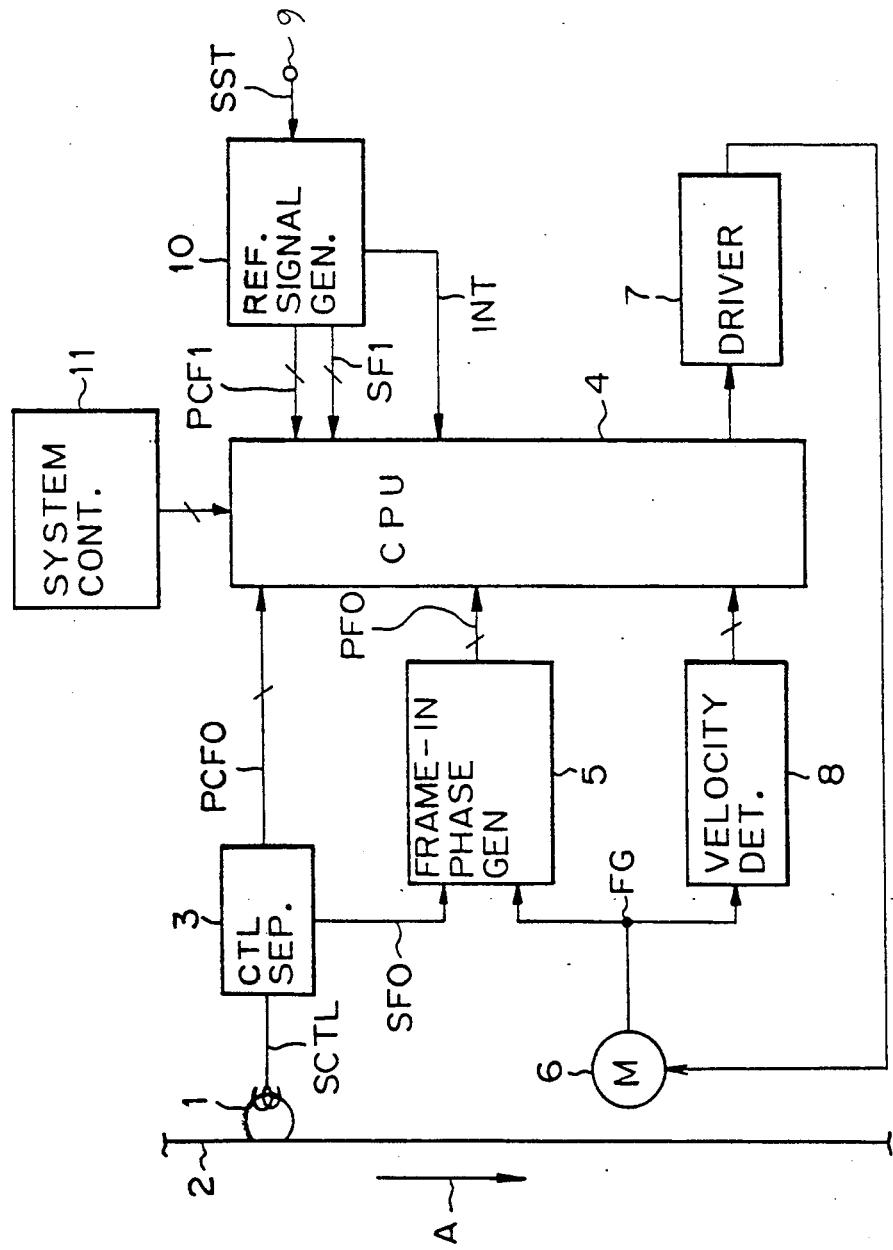
FIG. 1 is a block diagram showing an embodiment according to the present invention.

In the construction shown in FIG. 1, a reproducing head 1 reproduces a color video signal and a CTL signal SCTL recorded on a magnetic tape 2. The CTL signal SCTL is sent to a separation circuit 3.

The CTL signal SCTL has information for distinguishing a color frame of the reproduced color video signal. For example, a signal waveform recorded at intervals of frames the longitudinal direction depends on the color frame. Thus, when a color frame is indicated with a control signal or the like in a time code reproduced signal, the present invention can be applied.

The separation circuit 3 detects a reproduced color frame phase PCF0 as shown in FIG. 2 in accordance with the reproduced CTL signal SCTL. In addition, the separation circuit 3 separates a frame signal SF0 with a phase in accordance with the CTL signal SCTL from the reproduced color frame phase PCF0. The reproduced color frame phase PCF0 is sent to a CPU 4, while the reproduced frame signal SF0 is sent to a frame-in phase generation circuit 5.

A capstan motor 6 is driven and controlled with a control signal which is sent from the CPU 4 to a driver circuit 7. By driving the capstan motor 6 to rotate, the magnetic tape 2 is traveled in the arrow A direction. A pulse signal FG which is formed by detecting the rotation of the capstan motor 6 for example magnetically is sent to the frame-in phase generation circuit 5 and a velocity detection circuit 8.

The frame-in phase generation circuit 5 has a counter which counts the pulse signal FG and which is reset by the frame signal SF0. Thus, a frame-in phase PF0 is formed whenever the pulse signal FG is received. The frame-in phase PF0 is sent to the CPU 4. As shown in FIG. 2, the frame-in phase PF0 is composed of four zones, for example A-D (0-3) or E-H (0-3). The velocity detection circuit 8 detects the rotation speed of the capstan motor 6 and the traveling speed of the magnetic tape 2 in accordance with the pulse signal FG. This speed information is sent to the CPU 4.

A reference signal SST which is separated from a reference color video signal is fed to a reference signal generation circuit 10 through a terminal 9. The reference signal generation circuit 10 forms a reference color frame phase PCF1 and a reference frame signal SF1 (shown in FIG. 2) which synchronizes them with the reference signal SST and sends them to the CP0 4. In addition, the reference signal generation circuit 10 forms an interrupt signal INT for interrupting the CPU 4 and then sends it thereto. The interrupt signal INT has a frequency four times as high as the frame frequency, namely 120 Hz in the NTSC scheme. By interrupting the CP0 4 four times in one frame period, the reference frame-in phase PF1 is formed. The reference frame-in phase PF1 is composed of four zones, for example, A-D (0-3) or E-H (0-3) like the reproduced frame-in phase PF0.

A system controller 11 controls the entire operation of the system. The system controller 11 sends to the CPU 4 mode signals such as stop (STOP), play (PLAY), color frame lock, and so forth.

Then, the processors of the CPU 4 performed by software are described.

The CPU 4 is interrupted with the timing at which the interrupt signal INT is sent. In the interrupt state, the following processes are performed.

(1) The CPU 4 reads a reference color frame phase PCF1 from the reference signal generation circuit 10 and forms a counter which counts up the interrupt signal INT, the counter being reset when the reference frame signal SF1 is changed from high level to low level, thereby forming a reference frame-in phase PF1 which corresponds with count value n. Thus, the reference color frame phase PCF1 and the reference frame-in phase PF1 of the reference signal SST can be always determined.

(2) When the magnetic tape 2 is stopped, the reproduced color frame phase PCF0 and the reproduced frame phase PF0, which are formed from the reproduced CTL signal SCTL, are read. In addition, an optimum start reference signal phase is determined with the color frame phase PCF0, the frame phase PF0, and a color frame lock mode command sent from the system controller 11. In this case, the relation between a time and a phase at which the magnetic tape 2 is traveled at the normal ($\times 1$) speed after it is stopped has been predetermined and stored in the CPU 4.

(3) In the state where the magnetic tape 2 is stopped, when a play mode command is sent from the system controller 11, the magnetic tape 2 is kept stopped until the reference color frame phase PCF1 and the reference frame-in phase PF1 become optimum start timings. When they become the optimum start timings, the traveling of the magnetic 2 is started.

As an example, consider the case where an NTSC scheme reference color video signal at 30 frames per sec is used in the color frame lock mode (one color frame is composed of two frames) and the rotation of the capstan motor 6 becomes the normal speed ($\times 1$) in 0.2 sec.

When the amount of the magnetic tape 2 which is traveled after the traveling is started until it becomes the normal ($\times 1$) speed (namely, for 0.2 sec.) is represented with the number of frames:

Reference color video signal (reference signal SST)

$:30 \times 0.2 = 6$

Reproduced color video signal (magnetic tape 2)

$$30\times(0.2/2)=3$$

(where the acceleration of the magnetic tape 2 is constant).

Figure 3A:
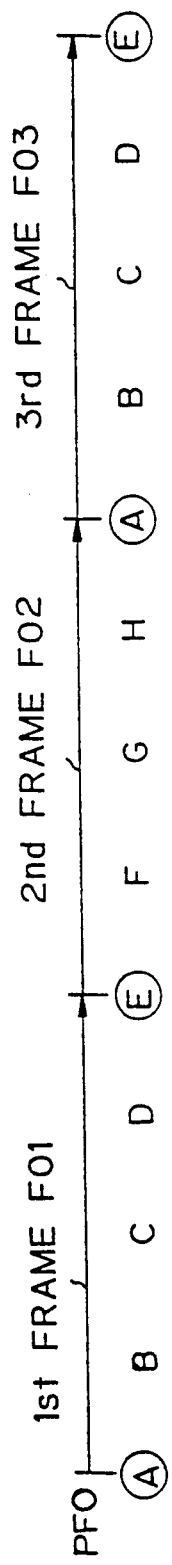
FIG. 3 is a schematic diagram describing the determination of an optimum start phase.

When assuming that the phase at which the magnetic tape 2 is stopped is detected at A zone shown in FIG. 2 by using the CTL signal SCTL and the FG pulse FG which have been played back, since the magnetic tape 2 is traveled for three frames from the point at which it is started until it reaches the normal ($\times 1$) speed, the frame-in phase PF0 at which the traveling speed of the magnetic tape 2 becomes the normal ($\times 1$) speed is placed at E zone of the third frame F03 as shown in FIG. 3A.

Figure 3B:
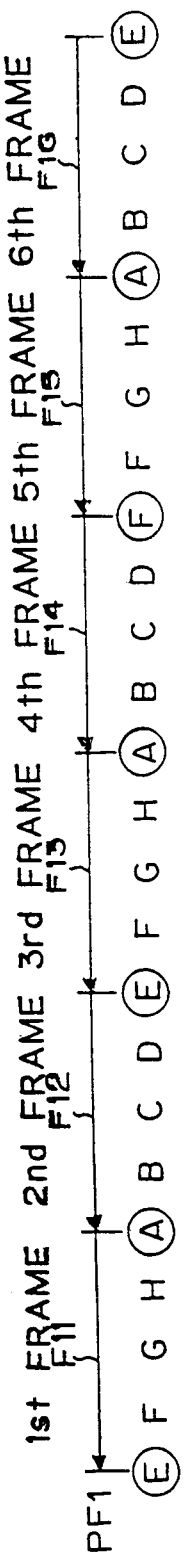

Therefore, so that after six frames the reference frame-in phase PF1 is placed at the E zone, it is necessary to start moving the magnetic tape 2 from the zone six frames earlier than the E zone of the sixth frame F16 as shown in FIG. 3B, that is, from the E zone of the first frame F11. In this manner, the optimum start phase can be obtained by using the reproduced frame-in phase PF0 at which the magnetic tape 2 is stopped.

Thus, in accordance with the reproduced CTL signal SCTL and the FG pulse FG, the color frame phase PCF0 and the frame-in phase PF0 at which the magnetic tape 2 is stopped can be detected. In addition, by using the color frame-in phase PCF0, the frame phase PF0, and the predetermined time for which the magnetic tape 2 becomes the normal ($\times 1$) speed, the number of frames and the frame-in phase at which the traveling speed of the magnetic tape 2 becomes the normal ($\times 1$) speed can be obtained. Moreover, by using the time for which the magnetic tape 2 becomes the normal ($\times 1$) speed, the number of frames and the reference frame-in phase PF1 can be obtained. Therefore, by using the relation between the number of frames and the frame phase PF0 of the magnetic tape 2 and the relation between the number of frames and the reference frame phase PF1 of the reference signal SST, an optimum start reference signal phase can be obtained. When the play mode command is sent from the system controller 11, the magnetic tape 2 remains stopped until the reference color frame phase PCF1 and the reference frame-in phase PF1 of the reference signal SST become, what have been predetermined. When they become what has been predetermined, the moving of the magnetic tape 2 is started. Thus, since the reference color frame phase PCF1, the reference frame-in phase PF1, the reproduced color frame phase PCF0 and the reproduced frame-in phase PF0 can be securely matched, the relocking of the color frames can be omitted, thereby shortening the lock up time.

In the above mentioned embodiment, the reproduced frame-in phase PF0 and the reference frame-in phase PF1, where one frame consists of four zones, are provided. However, the present invention is not limited to this scheme. Rather, as the number of zones becomes large, since the start phase becomes close to an ideal value, the lock up time can be shortened. It is possible to consider eight zones as the maximum value, for example.

In addition, in the above mentioned embodiment, the NTSC scheme color video signal was exemplified for the description, the present invention is not limited to such a signal. Rather, the present invention can be applied to other scheme color video signals.

Moreover, in the above mentioned embodiment, since the relation between the number of frames and the frame phase PF0 of the reproduced color video signal at which the magnetic tape 2 is traveled at the normal ($\times 1$) speed and the relation between the number of frames and the frame phase PF1 of the reference color video signal are obtained, the phase of the stop position of the magnetic tape 2 can be optimally controlled.

According to the magnetic reproducing apparatus of the present invention, a reference color frame phase and a reference frame phase are formed in accordance with a reference color video signal. When the magnetic tape 2 is stopped, a color frame phase and a frame phase are formed by using the reproduced CTL signal and the FG pulse. Since the optimum start timing (the start reference signal phase) can be determined by using both the predetermined time for which the magnetic tape becomes the normal ($\times 1$) speed after it is started and the change of the frame phase, the phases of the color frames can be securely matched. Thus, the relocking of the color frames can be omitted, thereby reducing the lock up time.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. Apparatus for indicating a color frame of a color video signal and a control signal reproduced from a record medium, comprising:

means for generating a reference color frame signal and a signal having a frequency that is an integer multiple of the frequency of the reference color frame signal;

means for separating a reproduced color frame phase and a reproduced frame signal from said reproduced control signal;

means for generating a phase signal indicating where intervals of said reproduced frame signal are divided comprising means for detecting the rotation of a capstan motor driving said record medium and generating a detection signal and means for counting pulses in said detection signal from said rotation detection means, said means for counting being reset with said reproduced frame signal from said means for separating;

means for determining a start reference signal phase by using said separated reproduced color frame phase and said phase signal indicating where intervals of said reproduced frame signal are divided; and means for controlling movement of said record medium in accordance with said start reference signal phase and a predetermined acceleration duration of said record medium, so that said reproduced color frame signal from said record medium is matched with said reference color frame signal after a start up time.

2. The apparatus as set forth in claim 1, wherein said means for controlling controls the movement of said record medium so that after a start command takes place, said record medium is stopped until said start reference signal phase occurs and said record medium is started from said start reference signal phase.

3. Apparatus for indicating a color frame of a color video signal and a control signal reproduced from a record medium, comprising:

means for generating a reference color frame signal and a signal having a frequency that is an integer multiple of the frequency of the reference color frame signal;

means for separating a reproduced color frame phase and a reproduced frame signal from said reproduced control signal;

means for generating a phase signal indicating where intervals of said reproduced frame signal are divided;

means for determining a start reference signal phase by using said separated reproduced color frame phase and said phase signal indicating where intervals of said reproduced frame signal are divided; and means for controlling movement of said record medium in accordance with aid start reference signal phase and a predetermined acceleration duration of said record medium, wherein said means for controlling controls a stop position of said record medium so that said reproduced color frame signal from said record medium being started in accordance with a start command is matched with said reference color frame signal after a start up time.

4. The apparatus as set forth in claim 3, wherein said means for controlling controls the movement of said record medium so that after said start command takes place, said record medium is stopped until said start reference signal phase occurs and said record medium is started from said start reference signal phase.

* * * * *

UNITED STATES PATENT AND TRADEMARK OFFICE
CERTIFICATE OF CORRECTION

PATENT NO. : 5,194,961

DATED : March 16, 1993

INVENTOR(S) : Nagai

It is certified that error appears in the above-identified patent and that said Letters Patent is hereby corrected as shown below:

```
Col. 3, line 39, after "frames" insert --in--
Col. 4, line 9, change "CPO" to --CPU--
        line 15, change "CPO" to --CPU--
Col. 5, line 46, after "become" delete ","
```

In the Claims:

```
Col. 8, line 4, change "aid" to --said--
```

Signed and Sealed this

Tenth Day of May, 1994

Attest:

BRUCE LEHMAN

*Attesting Officer*     *Commissioner of Patents and Trademarks*